(12) United States Patent
Mont et al.

(10) Patent No.: US 7,086,052 B2
(45) Date of Patent: Aug. 1, 2006

(54) SOFTWARE INSTALLATION AND OPERATION WITH RANDOM SELECTION

(75) Inventors: Marco Casassa Mont, Bristol (GB); Keith Alexander Harrison, Woodcroft Chepstow (GB); Simon Shiu, Bristol (GB); Martin Sadler, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 636 days.

(21) Appl. No.: 10/336,590

(22) Filed: Jan. 3, 2003

(65) Prior Publication Data

US 2003/0145318 A1 Jul. 31, 2003

(30) Foreign Application Priority Data

Jan. 9, 2002 (GB) ................. 0200365.5

(51) Int. Cl.
G06F 9/445 (2006.01)

(52) U.S. Cl. ................. 717/177; 713/1; 713/2
(58) Field of Classification Search ............. 717/177; 713/1, 2
See application file for complete search history.

(56) References Cited

U.S. PATENT DOCUMENTS

| | | | | |
|---|---|---|---|---|
| 5,761,380 A | * | 6/1998 | Lewis et al. | 706/47 |
| 5,794,052 A | * | 8/1998 | Harding | 717/178 |
| 5,951,639 A | | 9/1999 | MacInnis | |
| 6,067,622 A | * | 5/2000 | Moore | 726/31 |
| 6,351,850 B1 | * | 2/2002 | van Gilluwe et al. | 717/175 |
| 6,405,362 B1 | * | 6/2002 | Shih et al. | 717/174 |
| 6,457,122 B1 | * | 9/2002 | Ramezani | 713/1 |
| 6,578,142 B1 | * | 6/2003 | Anderson et al. | 713/2 |
| 6,698,018 B1 | * | 2/2004 | Zimniewicz et al. | 717/175 |
| 6,836,859 B1 | * | 12/2004 | Berg et al. | 714/36 |
| 6,976,066 B1 | * | 12/2005 | Mouhanna et al. | 709/223 |

FOREIGN PATENT DOCUMENTS

| | | |
|---|---|---|
| EP | 0575127 A2 | 12/1993 |
| WO | WO00/68836 | 11/2000 |

OTHER PUBLICATIONS

Random Number Generators Good Ones are Hard to Find, Stephen K. Park et al, ACM, 1988, vol. 31, No. 10, pp. 1192-1201.*
Software Engineering for Security: a Roadmap, Premkumar Devanbu et al, 2000, ACM, pp. 225-239.*
Focus on HP OpenView, Nathan J. Muller, 1995, Chapters 6-12.*

* cited by examiner

*Primary Examiner*—Todd Ingberg
(74) *Attorney, Agent, or Firm*—Thomas, Kayden, Horstemeyer & Risley, LLP

(57) ABSTRACT

A software system for installation on computing apparatus (and a method of installing such a software system on computing apparatus), wherein the software system is provided in the form of a software package including a plurality of software components, one or more of the software components being provided as a plurality of different implementations, the apparatus including an installation engine for installing the software system only a selected one implementation of the or each of the software components having multiple implementations, and a random selector module for selecting one of the plurality of implementations of a software component for installation. Thus, software package would still be distributed to its consumers as a single version but each installation of the package on a user's computing apparatus is potentially different, which reduce the risk of faults in and attacks against software components having one or more "bugs" therein because not all consumers will have the same implementation of any one software component.

30 Claims, 2 Drawing Sheets

SOFTWARE INSTALLATION AND OPERATION WITH RANDOM SELECTION

FIELD OF THE INVENTION

This invention relates to software installation and operation and, more particularly, to a method and apparatus for reducing the occurrence of faults and malfunctions within a software-based operating system and/or application caused by "bugs" which are common to software systems, and for reducing the resultant vulnerability of such systems to attack.

BACKGROUND TO THE INVENTION

The current personal and commercial computing environment is largely dominated by the use of a very few software systems, at the operating system (OS) level (e.g. Microsoft, Linux, Unix, etc.), application level (such as application suites such as Microsoft Office and the like) and Internet access level (such as browsers and web servers like those provided by Netscape, Microsoft, etc.). Such software systems are generally supplied by the software provider as a package on some form of storage medium, including each of the components and installation software which, when run on the customer's computing equipment, installs the various components on its hard disk for future use. The individual components included in each package is generally identical to like components on other packages provided by the same software provider to other customers, with the result that all of the software provider's customers are provided with identical implementations of each software component.

Unfortunately, software "bugs" are an inevitable occurrence in most, if not all, implementations of any software component. The adverse effects of such bugs vary in severity, but all are generally capable of causing faults and malfunctions within the associated software component, and some can leave the software component vulnerable to external attack, which is clearly undesirable. In view of the fact that every customer's version of a particular software component is identical, each version of that software component will include the same bugs as all of the others. As a result, large scale attacks on software systems are successful because computer hackers and the like make the (correct) assumption that most, if not all, of the targeted operating systems or software applications are built in exactly the same way and, as such, have the same bugs and problems associated therewith. Similarly, a major fault or malfunction caused by a bug in the software system will affect all consumers and users thereof in the same way.

One known way of overcoming, or at least reducing, the above-mentioned problems is to provide an operating system or application, in which each of the software components is implemented in a plurality of different ways, and the different implementations of the components are run in parallel, usually on different machines. A voting mechanism is used as the basis for this approach, in which the correct result for an operation is the one achieved by the majority of software implementations performing the operation. However, this approach is very expensive, both in terms of software development (in the sense that different software providers are generally employed to provide each different implementation of a piece of software) and resources, and is therefore usually only used in very specific and critical contexts, such as the software running in nuclear power stations, aircraft, spacecraft, etc.

We have now devised an arrangement which seeks to alleviate the above-mentioned problems.

SUMMARY OF THE INVENTION

Thus, in accordance with the present invention, there is provided a software system for installation on computing apparatus, wherein the software system comprises a plurality of software components, one or more of said software components being provided as a plurality of different implementations, the apparatus including installation means for installing the software system on said computing apparatus, the installation means being arranged to install on said computing apparatus only a selected one implementation of the or each of the software components having a plurality of implementations.

Also in accordance with the present invention, there is provided a method of installing a software system on computing apparatus, wherein the software system comprises a plurality of software components, one or more of said software components being provided as a plurality of different implementations, the method comprising the steps of installing any software component provided as a single implementation and installing only a selected one implementation of the software components having a plurality of implementations.

Further in accordance with the present invention, there is provided a data carrier containing application software forming a software system as provided above or adapted for installing as software system by a method as provided above.

As such, the present invention introduces an element of diversity into widely-used software systems, such that each installation of a particular operating system or software application differs from many of the others, but preserves the same functionality, such that a bug occurring in one implementation of a particular software component will be included only in the versions of the software system including that particular implementation. Any potentially large-scale fault or malfunction caused by that bug, and any attack based on the vulnerability caused by that bug will only affect the relatively few versions of the software system including the associated software component implementation. Other consumers running the software systems will be unaffected.

In other words, the present invention is intended to reduce attacks and faults based on "bugs" common to widespread software systems by increasing the diversity of such software systems by means of the random (or otherwise) selection of core software components at the time of installation of the software system. It is not, however, as expensive or impractical for most software systems as the above-mentioned prior art arrangement in which several implementations of each software component are run in parallel, because only a single copy of a software system is installed on a user's machine in each case; however, its individual components are selected randomly at the time of installation from among many different available implementations provided as part of the software package. The selection of software components installed on a computer during any installation process may be purely random. In another embodiment, the software system may be required to be installed on a plurality of computers, in which case, the selection of software components to be installed in each case may be dependent upon implementations previously installed on the other computer. In yet another embodiment, the implementations to be installed in any case may be fixed or predetermined as required.

BRIEF DESCRIPTION OF THE DRAWINGS

An embodiment of the present invention will now be described by way of example only and with reference to the accompanying drawing, in which.

DETAILED DESCRIPTION OF THE INVENTION

Figure 1:
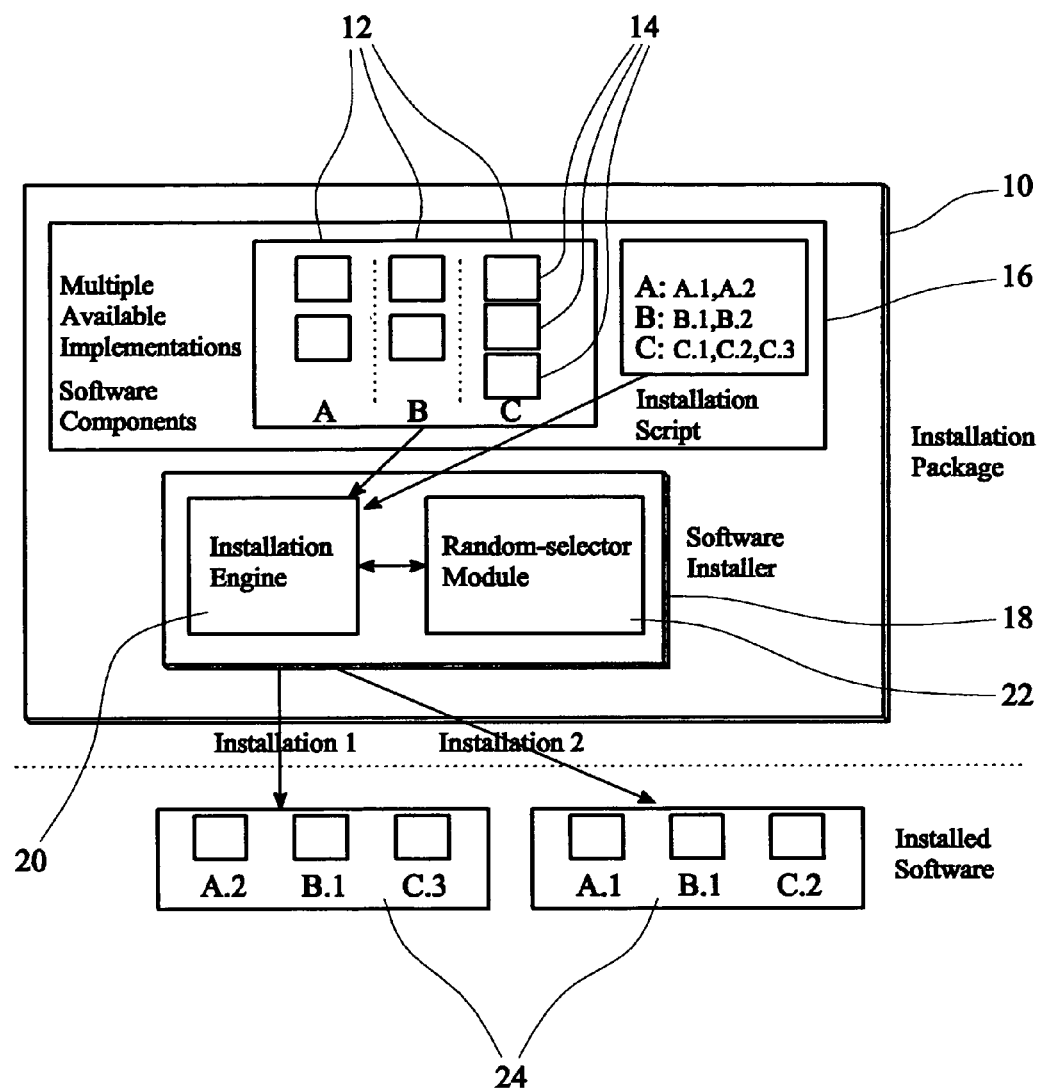
FIG. 1 is a schematic block diagram of the high level architecture of a software package including an exemplary embodiment of the present invention.

Referring to FIG. 1 of the drawings, a software package 10 comprises a plurality of software components 12, at least some of which may be provided in the form of multiple implementations. It will be appreciated that several different implementations of a software component can be provided, each having substantially the same functionality, simply by, for example, providing the same software specification to a plurality of different software designers and/or by creating the software component in a plurality of different computing languages. It is well known that several different implementations of a software component can be produced in many different ways by varying many different factors, and the present invention is not intended to limited in this respect. Each implementation of the same software component should have substantially the same functionality as all of the other implementations thereof, but otherwise their various constructions can be varied according to requirements and/or available resources.

Examples of software components are operating system (OS) modules, such as TCP/IP stack, job scheduler, memory manager, etc., and application modules, such as a web browser rendering module, contact manager, e-mail distributor, etc. It will be appreciated that not all of the software components in a software package need be provided in the form of a plurality of implementations. Some of the less critical components may have only one implementation, with two or more implementations being provided for critical components only. The decision as to how critical a software component is perceived to be and/or whether several implementations of a software component should be provided (and, if so, how many) will be entirely dependent upon the package designer and (perhaps to a lesser extent) on consumer and user requirements. For the purposes of the following description, we shall assume that there are at least two implementations 14 of each "critical" software component 12 in the software package 10, but it will be appreciated that the invention is in no way intended to be limited in this regard, and requires only that at least one of the software components in the package is provided in the form of at least two implementations.

The software components 12 and their various implementations are referred to by (or referenced in) an installation script 16, which is essentially a list identifying the software components required to be installed with each software component identified therein having associated therewith a sub-list of the available implementations thereof provided in the package. Thus, in this case, the installation script 16 indicates that there are three software components A, B and C required to be installed, and that component A has two implementations (A1, A2), component B has two implementations (B1, B2) and component C has three implementations (C1, C2, C3).

The software package 10 also includes a software installer 18 having an installation engine 20, which is essentially a software module which instals the software components 12 onto a user's computing equipment (together with any ancillary software which may be required to run the software components). The construction of the installation engine is essentially dependent on the nature of the software package itself, but as a generic concept is well known in the art.

However, in the case of the present invention (in accordance with one embodiment thereof), the software installer 18 is provided with a selector module 22. In the case of this exemplary embodiment of the present invention, the selector module 22 is a random selector module which is adapted to randomly select, for each software component having multiple implementations, the software component 12 to be installed on the user's computing equipment during any particular installation operation.

At the time of installation of the software package on a user's computing equipment, the software installer 18 consults the installation script 16 and, for each software component to be installed, retrieves the sub-list of available implementations of the software components and transmits it to the selector module 22. The random selector module 22 makes a random choice of the available implementations of the software components and returns its answer to the installation engine 20 which then installs the chosen implementation of each respective software component. The software installer 18 is arranged to delete all other implementations of the software components provided within the software package, i.e. those not installed during any particular installation operation, such that the redundant implementations are not available at the computing equipment on which the software package has been installed.

In its simplest form, the random selector module 22 may comprise a random number generator. In this case, each available combination of software components and implementations thereof provided within the software package is assigned a number or code as a sub list for each software component, from which the selector module 22 can select and return its answers. However, any form of selection function which can make a single random selection from among a plurality of provided options would be suitable for this purpose.

It will be appreciated that the random selector module 22 should be properly initialised and "seeded" (with random information like time, mouse and keyboard movements/operations, and the like) so as to ensure that it starts in a randomly-determined state and generates random choices from the available options each time the software package is required to be installed. This initialisation and seeding process will be well understood by a person skilled in the art.

Thus, the present invention provides a mechanism for reducing the risks of attacks against and faults within software systems (such as operating systems and software applications) by increasing the diversity of such systems. This is achieved in the present invention by (preferably random) selection of core software components at the time of installation of the software system onto a user's computing equipment. Thus, the software packages as they are distributed to consumers will be identical but the software system 24 installed a particular user's computing equipment is potentially different from that of many other consumers of the same software package, thereby reducing many users' vulnerability by increasing the diversity of the software systems in use. As explained above, such diversity reduces the likelihood of success of large-scale attacks and faults based on assumptions made about popular and widespread software systems.

In order to achieve the above-mentioned objectives, the present invention requires the availability of multiple implementations of (at least critical) software components. In each case, only one of the available implementations is (preferably randomly) selected and actually installed on a user's computing equipment. No additional resources are required to run the software system, because all of the initially available implementations which are not subsequently installed are preferably deleted, but in any event they are redundant after the installation operation has been completed. The additional overhead of the present invention occurs only at the time of installation and, as such, is minimal compared to the resultant risk reduction.

Figure 2:
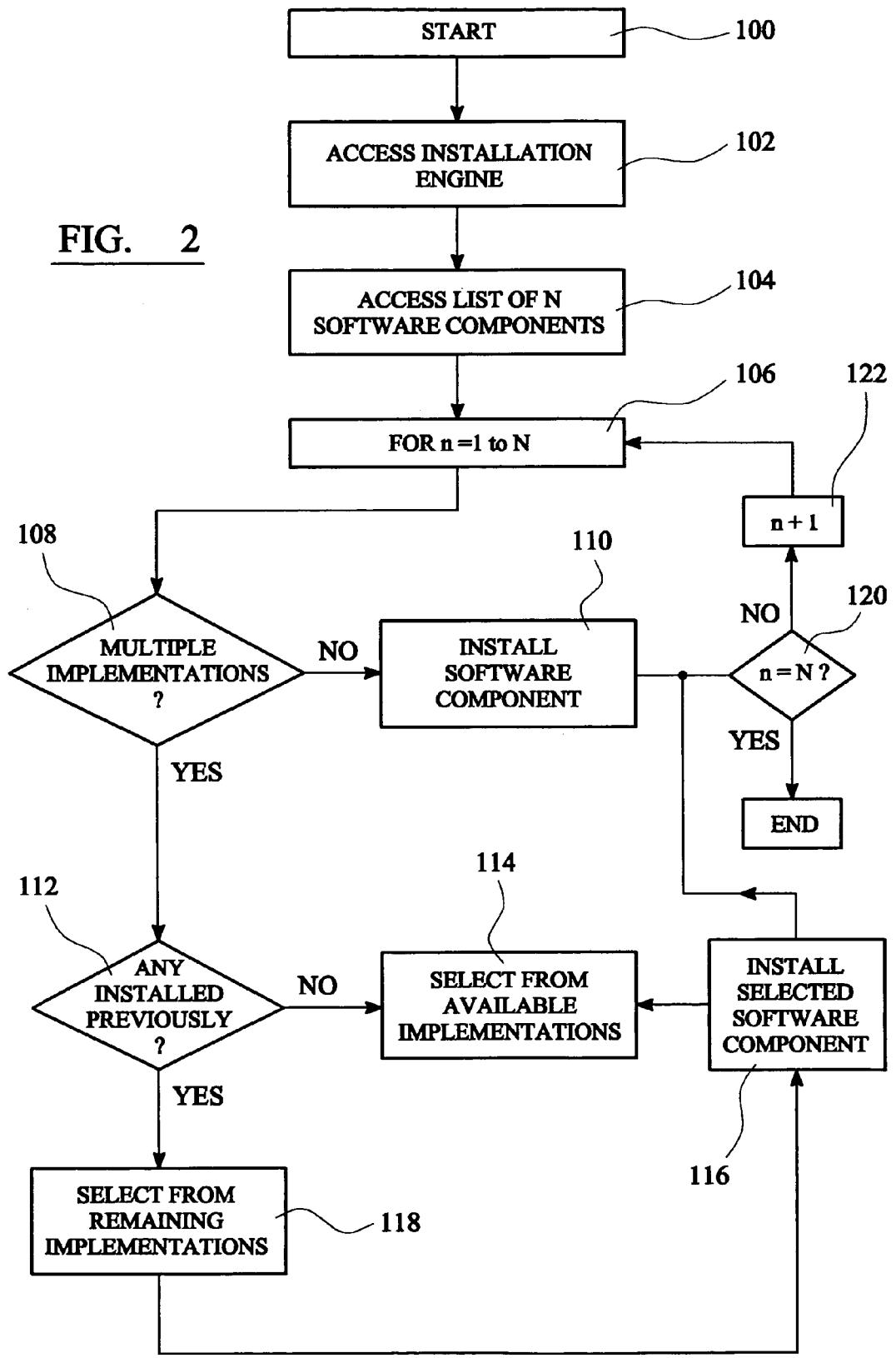
FIG. 2 is a flow diagram illustrating a method of installing a computer program according to an exemplary embodiment of the invention.

As illustrated by the flow diagram of FIG. 2, a method of installing a computer program according to an exemplary embodiment involves the steps of entering a command (at step 100) to a computer to instal the computer program (which is stored on a data carrier provided to the computer). In the first instance, the installation engine provided on the data courier is accessed (at step 102) and the installation engine consults the provided installation script and accesses (at step 104) a list of all software components and their available implementations.

For the purposes of this description, there may be considered to be N software components making up the computer program, at least one of which is provided as two or more different implementations.

Thus (at step 106) for software component n=1 to N, the following process is performed. At step 108, the installation engine determines if software component n is provided as a plurality of different implementations. If not, the only version of that software component is installed on the computer (at step 110).

If, however, the software component n is provided as a plurality of implementations, it is determined (at step 112) if any of those implementations have been previously installed on another computer (within a predetermined set). If not, the selector module of the installation engine selects (at step 114) one of the available implementations and instals it on the computer (at step 116). Otherwise, the selector module selects (at step 118) an implementation only from the remaining implementations (not previously installed on another computer).

When a software component has been successfully installed on the computer, it is determined (at step 120) if n=N. If not, n is incremented by 1 (at step 122) and the above-described process (from step 106) is repeated. Otherwise, the installation process is complete.

In the foregoing specification, the invention has been described with reference to specific exemplary embodiments thereof. It will, however, be apparent to a person skilled in the art that various modifications and changes may be made thereto without departing from the broader spirit and scope of the invention as set forth in the appended claims. Accordingly, the specification and drawings are to be regarded in an illustrative, rather than a restrictive, sense.

The invention claimed is:

1. A software package for installation on a computer, the software package tangibly embodied on a computer readable medium, wherein the software package comprises a plurality of software components, one or more of said software components being provided as a plurality of different implementations, the software package including installation engine for installing a software system on said computer, the installation engine being arranged to install on said computer only a selected one implementation of the or each of the software components having a plurality of implementations, wherein said installation engine is arranged to install on said computer a randomly selected one implementation of the or each of said software components having a plurality fun implementations.

2. A software package according to claim 1, wherein said installation engine is arranged to determine which implementation(s) of the or each of said software components having a plurality of implementations have been previously installed on another computer and to install a randomly selected one of the remaining implementations of said software components on said computer.

3. A computer system for installing a computer program on a computer, the computer system executing the software package of claim 2.

4. A software package according to claim 1, wherein the implementations not installed on said computer are deleted from or otherwise archived within said computer.

5. A computer system for installing a computer program on a computer, the computer system executing the software package of claim 4.

6. A software package according to claim 1, wherein said installation engine comprises an installation module and a selector module, the selector module being arranged to receive a list of available implementations of a software component provided on said software package, select one of said implementations from said list, and return data representative of the selected implementation to said installation module for installation of the selected implementation on said computer.

7. A computer system for installing a computer program on a computer, the computer system executing the software package of claim 6.

8. A software package according to claim 6, wherein said selector module is arranged to randomly select one of said implementations from said list provided by said installation module.

9. A computer system for installing a computer program on a computer, the computer system executing the software package of claim 8.

10. A software package according to claim 8, wherein said selector module is a random number generator.

11. A computer system for installing a computer program on a computer, the computer system executing the software package of claim 10.

12. A software package according to claim 1, including an installation script comprising a list of the software components to be installed on said computer and a sub-list associated with each software component having multiple implementations provided on said software package, each sub-list comprising data identifying all available implementations of the respective software component.

13. A computer system for installing a computer program on a computer, the computer system executing the software package of claim 12.

14. A computer system for installing a computer program on a computer, the computer system executing the software package of claim 1.

15. A method of installing a computer program on a computer, said computer program consisting of a plurality of software components, the method comprising the steps of providing a software package including said plurality of software components, one or more of said software components being provided as a plurality of different implementations, the method further comprising the steps of installing on said computer any software component provided as a single implementation, installing on said computer only a selected one implementation of the software components having a plurality of implementations, and installing on said computing apparatus a randomly selected one implementation of the or each of said software components having a plurality of implementations.

16. A method according to claim 15, comprising the step of deleting from, or otherwise archiving within, said computer the implementations included in said software package and not installed on said computer apparatus.

17. A computer system for installing a computer program on a computer, the computer system programmed to perform the method of claim 16.

18. A method according to claim 15, comprising the step of providing an installation module and a selector module, the selector module being arranged to receive a list of available implementations of a software component provided on said software package, select one of said implementations from said list, and return data representative of the selected implementation to said installation module for installation of the selected implementation on said computer.

19. A computer system for installing a computer program on a computer, the computer system programmed to perform the method of claim 18.

20. A method according to claim 18, wherein said selector module is arranged to randomly select one of said implementations from said list provided by said installation module.

21. A computer system for installing a computer program on a computer, the computer system programmed to perform the method of claim 20.

22. A method according to claim 20, wherein said selector module is a random number generator.

23. A computer system for installing a computer program on a computer, the computer system programmed to perform the method of claim 22.

24. A method according to claim 15, comprising the steps of providing an installation script comprising a list of the software components to be installed on said computer and a sub-list associated with each software component having multiple implementations provided on said software package, each sub-list comprising data identifying all available implementations of the respective software component.

25. A computer system for installing a computer program on a computer, the computer system programmed to perform the method of claim 24.

26. A computer system for installing a computer program on a computer, the computer system programmed to perform the method of claim 15.

27. A computer program for installation on a computer, said computer program tangibly embodied on a computer readable medium, said comprising a plurality of software components and being provided as a software package on a data carrier, said software package including said plurality of software components in respect of at least one of which is provided within said software package a plurality of different implementations, and an installation engine arranged to install on said computer a randomly select one implementation of the or each of said software components having a plurality of implementations.

28. A computer system for installing a computer program on a computer, the computer system executing the computer program of claim 27.

29. A computer program for installation on a computer, said computer program tangibly embodied on a computer readable medium, said computer program comprising a plurality of software components and being provided as a software package on a data carrier, said software package including said plurality of software components, in respect of at least one of which is provided within said software package a plurality of different implementations, and an installation engine arranged to determine which implementation(s) of the or each of said software components having a plurality of implementations have been previously installed on another computer, and to install a randomly selected one of the remaining implementations of said software components on said computer.

30. A computer system for installing a computer program on a computer, the computer system executing the computer program of claim 29.

* * * * *